United States Patent
Huh et al.

(10) Patent No.: US 10,017,184 B2
(45) Date of Patent: Jul. 10, 2018

(54) METHOD FOR RELEASING CREEP TORQUE CONTROL OF VEHICLE BEFORE STOP

(71) Applicants: HYUNDAI MOTOR COMPANY, Seoul (KR); KIA MOTORS CORPORATION, Seoul (KR)

(72) Inventors: Jee Wook Huh, Bucheon-si (KR); Gwang Il Du, Incheon (KR); Song Il Park, Seoul (KR); Kyoung Cheol Oh, Suwon-si (KR); Sung Deok Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 264 days.

(21) Appl. No.: 14/956,266

(22) Filed: Dec. 1, 2015

(65) Prior Publication Data
US 2017/0072960 A1    Mar. 16, 2017

(30) Foreign Application Priority Data
Sep. 11, 2015 (KR) .......... 10-2015-0128767

(51) Int. Cl.
| B60W 30/18 | (2012.01) |
| B60W 20/30 | (2016.01) |
| F16H 63/40 | (2006.01) |
| B60W 10/08 | (2006.01) |
| B60W 10/113 | (2012.01) |
| F16H 61/20 | (2006.01) |

(52) U.S. Cl.
CPC ...... *B60W 30/18063* (2013.01); *B60W 10/08* (2013.01); *B60W 10/113* (2013.01); *B60W 20/30* (2013.01); *F16H 61/20* (2013.01); *F16H 63/40* (2013.01); *B60W 2520/10* (2013.01); *B60W 2540/16* (2013.01); *B60W 2710/083* (2013.01); *B60W 2710/1005* (2013.01); *F16H 2061/202* (2013.01); *F16H 2312/06* (2013.01)

(58) Field of Classification Search
CPC .............................................. B60W 30/18063
See application file for complete search history.

(56) References Cited

U.S. PATENT DOCUMENTS

| 2003/0171186 A1* | 9/2003 | Okada .................... B60K 31/04 477/71 |
| 2013/0017928 A1* | 1/2013 | Oh .......................... F16H 61/20 477/94 |
| 2013/0090800 A1* | 4/2013 | Nakamura .......... B60L 15/2063 701/22 |

(Continued)

FOREIGN PATENT DOCUMENTS

| JP | 2002-152910 A | 5/2002 |
| JP | 2006-298064 A | 11/2006 |

(Continued)

*Primary Examiner* — Tisha D Lewis
(74) *Attorney, Agent, or Firm* — McDermott Will & Emery LLP

(57) ABSTRACT

A method for releasing creep torque control of a vehicle before a stop includes a step of when creep torque is controlled for a shift before a stop of the vehicle, creep torque control is released in consideration of a current shift gear position if an actual creep torque value controlled during a shift becomes equal to a target creep torque value.

10 Claims, 3 Drawing Sheets

(56) References Cited

U.S. PATENT DOCUMENTS

2015/0321675 A1* 11/2015 Park ..................... B60W 10/08
                                                                701/53
2016/0016469 A1*  1/2016 Yamada ................ B60K 31/02
                                                                701/22

FOREIGN PATENT DOCUMENTS

| KR | 10-2010-0057370 A |   | 5/2010  |            |
|----|-------------------|---|---------|------------|
| KR | 10-2011-0012160 A |   | 2/2011  |            |
| KR | 10-2011-0035694 A |   | 4/2011  |            |
| KR |    20110035694 A  | * | 4/2011  | ............ B60W 20/00 |
| KR |       10-1080799 B1 |   | 11/2011 |            |
| KR | 10-2012-0058147 A |   | 6/2012  |            |
| KR | 10-2015-0066907 A |   | 6/2015  |            |
| WO |     2014-068656 A1 |   | 5/2014  |            |

\* cited by examiner

METHOD FOR RELEASING CREEP TORQUE CONTROL OF VEHICLE BEFORE STOP

CROSS-REFERENCE TO RELATED APPLICATION

This application claims under 35 U.S.C. § 119(a) the benefit of priority to Korean Patent Application No. 10-2015-0128767, filed on Sep. 11, 2015 with the Korean Intellectual Property Office, the entire contents of which are incorporated herein by reference.

TECHNICAL FIELD

The present disclosure relates to a method for releasing creep torque control of a green vehicle before a stop. More particularly, it relates to a method for releasing creep torque control of a green vehicle with a dual clutch transmission (DCT) before stop.

BACKGROUND

In general, shift before stop refers to a shift in a vehicle just before stopping and means shifting from the third gear position to the first gear position, shifting from the second gear position to the first gear position, or shifting from the third gear position to the second gear position (in case of 2-shift stop).

At a shift before a stop, since a vehicle speed is low and a shift ratio is high, shift feeling deteriorates even due to small changes of torque and, thus, creep torque control is essential.

In the case of a hybrid electric vehicle (HEV) with a conventional automatic transmission (A/T), when shifting from the third gear position to the first gear position or when shifting from the second gear position to the first gear position, torque during a shift before a stop should have a positive (+) value but, in the case of a dual clutch transmission (DCT), torque at a shift before a stop should have a negative (−) value. Further, the conventional automatic transmission (A/T) has a gear shift time before a stop which is 7 kph and the dual clutch transmission (DCT) has a gear shift time before stopping which is 3 kph lower than that of the conventional automatic transmission (A/T). Therefore, a creep torque control logic may be applied to the automatic transmission (A/T) even in the off state of an acceleration pedal position sensor (APS) or a brake pedal position sensor (BPS) but, in case of the dual clutch transmission (DCT), if creep torque control is carried out, a vehicle speed is lowered due to the creep torque having a negative (−) value, a gear shift time before a stop is low, i.e., 3 kph, and, thus, differentiation of release conditions is required.

SUMMARY OF THE DISCLOSURE

The present disclosure has been made in an effort to solve the above-described problems associated with the prior art and it is an object of the present disclosure to provide a method for releasing creep torque control of a green vehicle before stop, in which creep torque control is released under optimized conditions at shift before stop of a green vehicle with a dual clutch transmission (DCT).

In one aspect, the present disclosure provides a method for releasing creep torque control of a green vehicle before stop, in which, when creep torque is controlled for shift before stop of the vehicle, creep torque control is released in consideration of a current shift gear position if an actual creep torque value controlled during shift becomes equal to a target creep torque value.

In a preferred embodiment, if a difference between the actual creep torque value controlled during shift and the target creep torque value is a predetermined reference value or less, it may be judged that the actual creep torque value and the target creep torque are equal.

In another preferred embodiment, when the current shift gear position is a first gear position, a parking position (P position), a reverse position (R position) or a neutral position (N position), creep torque control may be released and, even if there is a difference between the actual creep torque value controlled during shift and the target creep torque value, as safety conditions, creep torque control may be preferably released if the current shift gear position is a parking position or a reverse position.

In still another preferred embodiment, when the current shift gear position is a second gear position or a third gear position and a current vehicle speed is a threshold value, which is set to regard the state of the vehicle as a stopped state, or less, creep torque control may be released.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
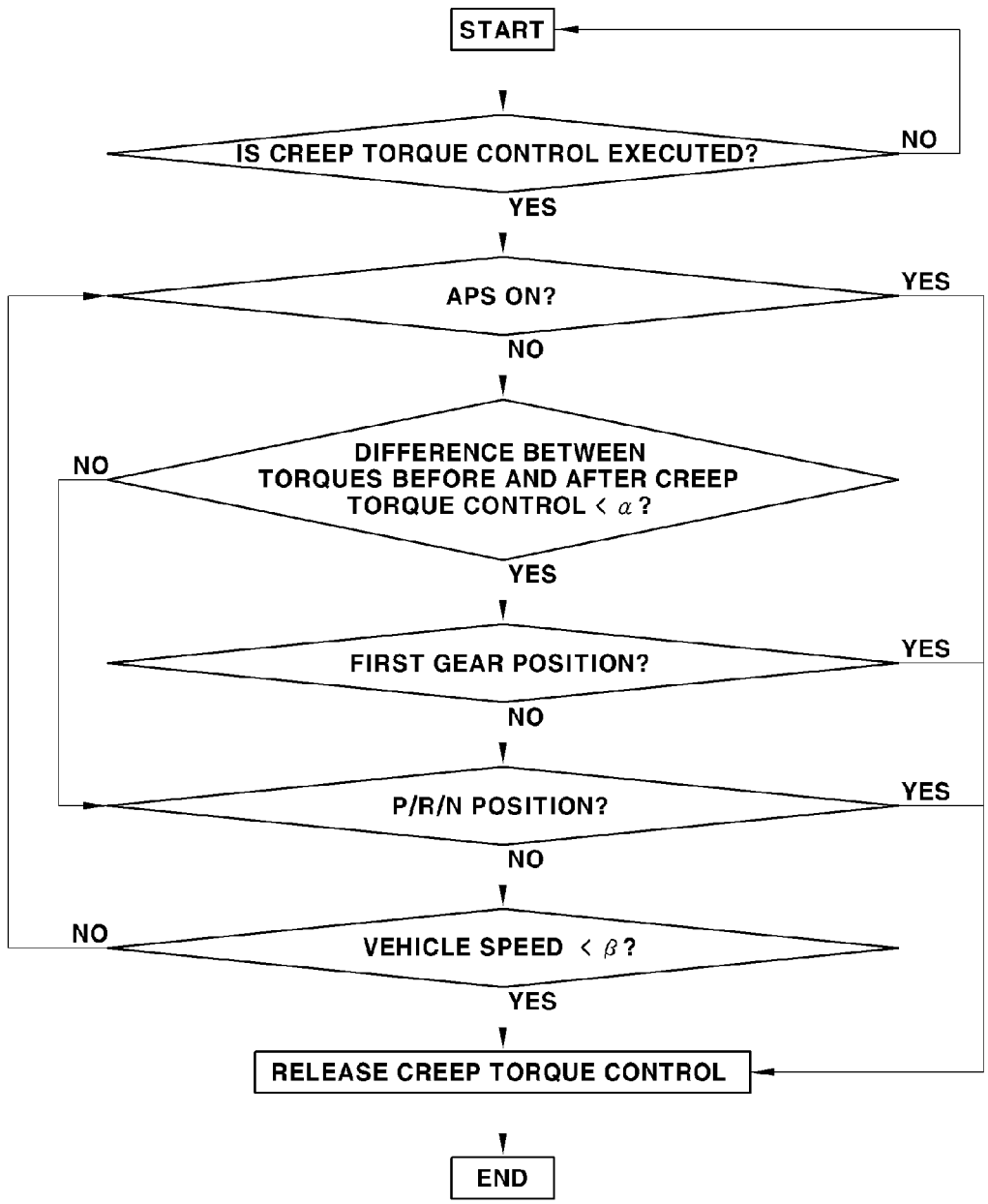
FIG. 1 is a flowchart illustrating a method for releasing creep torque control of a vehicle before a stop in accordance with the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 3:
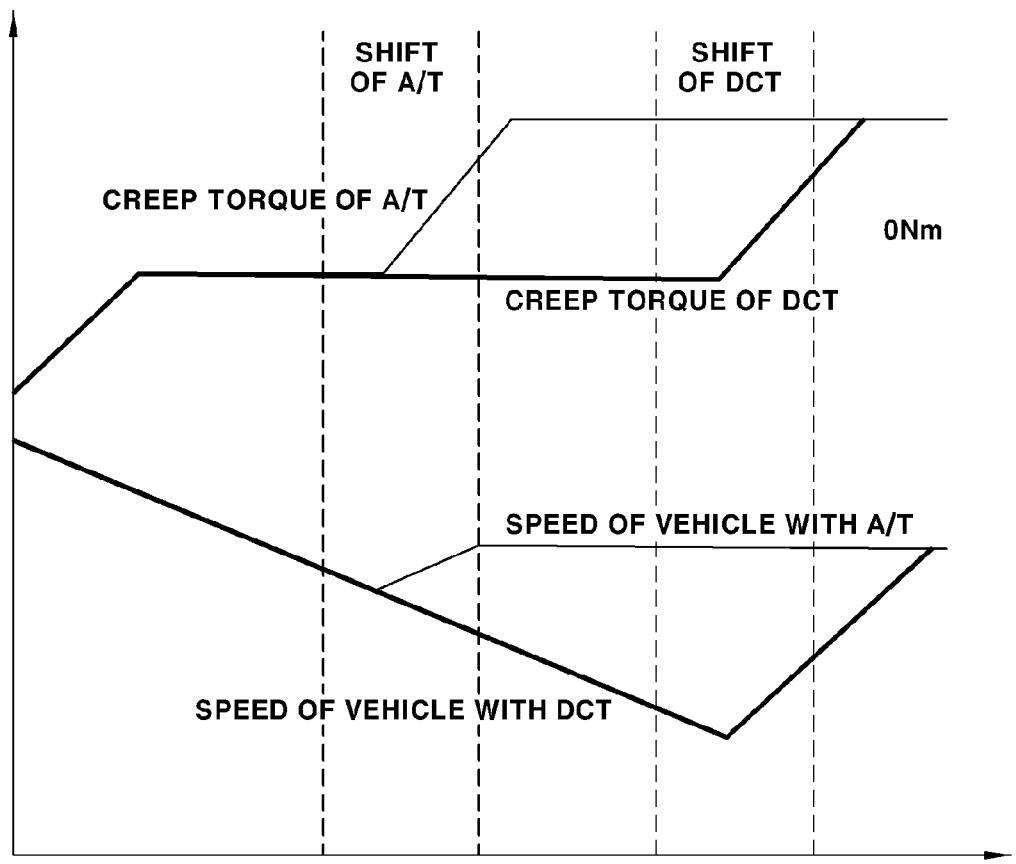
FIG. 3 is a graph illustrating problems generated if a method for releasing creep torque control of a hybrid electric vehicle with an automatic transmission is applied to a hybrid electric vehicle with a dual clutch transmission (DCT).

In technology employing a logic optimized for a vehicle with an automatic transmission (A/T), when a hybrid electric vehicle with an automatic transmission shifts from the third gear position to the first gear position before a stop or shifts from the second gear position to the first gear position, the creep torque of the hybrid electric vehicle is controlled to 0 (in more detail, is controlled to a negative (−) torque value close to 0), instructions are changed to a positive (+) value during a shift and then the vehicle is stopped (with reference to FIG. 3). Such technology prevents backlash due to a one-way clutch of the automatic transmission and applies positive (+) torque during a shift to raise a motor speed, thereby being optimized for the automatic transmission.

In the technology, creep torque control is released if an APS signal is input or if torques before and after creep torque control are equal.

Particularly, the reason why creep torque control is released if torques before and after creep torque control are equal, i.e., the reason why creep torque control is released if actual creep torque controlled at a shift before a stop reaches a set target creep torque, is that release of creep torque control is essentially required to execute separate control after a shift as well as during a shift.

However, a hybrid electric vehicle with a dual clutch transmission (DCT) may not use the control method optimized for the hybrid electric vehicle with the above automatic transmission.

In the vehicle with the DCT, since a gear shift time from the second gear position to the first gear position before stopping is very late, when the creep torque is controlled to have a negative (−) value, the coasting speed of the vehicle is excessively lowered (with reference to FIG. 3). Therefore, in the case of the vehicle with the DCT, creep torque control is restrictively used only when a brake is operated (i.e., only during braking). As torques before and after creep torque control become equal when the brake is released, the control method optimized for a vehicle with an automatic transmission (A/T) may not be used.

In more detail, in release conditions optimized for the vehicle with the NT, creep torque control is executed before actual creep torque controlled during a shift becomes equal to target creep torque set before a shift, i.e., before actual creep torque changed by execution of creep torque control at a shift before a stop becomes equal to target creep torque determined before execution of creep torque. However, in the case of the vehicle with the DCT, torques before and after creep torque control may become equal before a shift or during a shift and, thus, differentiation of release conditions is required.

Hereinafter, in the present disclosure, conditions for releasing creep torque control at a shift before a stop which are suitable for a hybrid electric vehicle (HEV) with a dual clutch transmission (DCT) will be described.

As is well known, in creep torque control, creep torque should be controlled to have a predetermined negative (−) value so as to execute a smooth shift before a stop and, thus, fuel efficiency improves.

However, when automatic transmission-based creep torque control is used, during coasting (during driving in the off state of a brake) or during repetition of on/off of the brake at the second gear position, actual creep torque of a hybrid electric vehicle with a dual clutch transmission may reach target creep torque before a shift is completed.

Therefore, under release conditions of the present disclosure, if torques before and after creep torque control become equal, in other words, if actual creep torque controlled at a shift before a stop becomes equal to target creep torque set before a shift, i.e., if actual creep torque controlled at a shift before a stop becomes equal to target creep torque desired to be reached through control during a shift, a logic to release creep torque control in consideration of the current gear position (shift gear position) is added. Further, creep torque control is released when an acceleration pedal position sensor (APS) is operated, and creep torque control is released in a state in which the shift gear position is a parking position (P position), a reverse position (R position) or a neutral position (N position). The reason for this is to avoid impossibility of starting the vehicle when the vehicle is restarted because, when a driver shifts from the second gear position to the N position, or R position or P position, release of creep torque control is not possible.

Further, in the present disclosure, by releasing creep torque control at a specific vehicle speed or lower, when the vehicle is stopped through sudden braking and then restarted in a state in which the vehicle does not enter the above conditions (the creep torque control release conditions), delay of starting may be minimized.

As is well known, the vehicle speed may be detected by a vehicle speed sensor mounted in the vehicle and creep torque control and release may be executed by a controller mounted in the vehicle.

Hereinafter, the present disclosure will be described with reference to the accompanying drawings.

Figure 2:
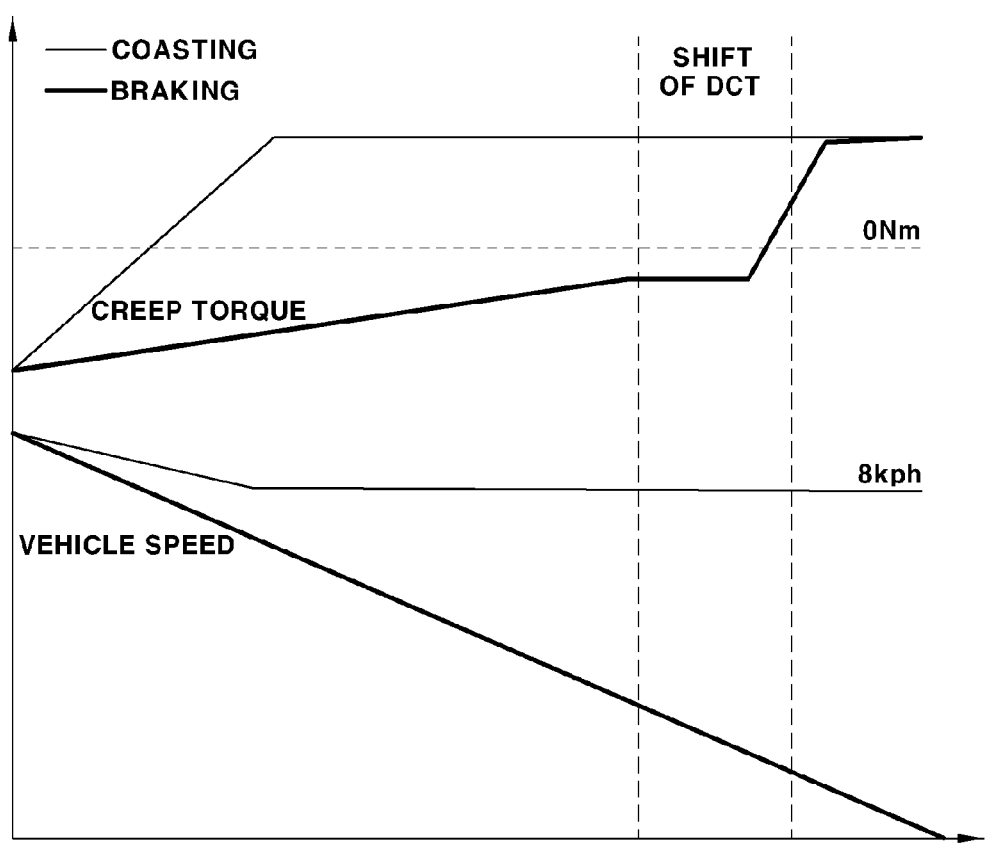
FIG. 2 is a graph illustrating effects of a method for releasing creep torque control of a vehicle before a stop in accordance with the present disclosure.

FIG. 1 is a flowchart illustrating a method for releasing creep torque control of a vehicle before a stop in accordance with the present disclosure and FIG. 2 is a graph illustrating effects generated when creep torque control is released in accordance with the present disclosure.

With reference to FIG. 1, when creep torque is controlled to have a set negative (−) value so as to execute a shift of a vehicle before a stop, creep torque control is released if the acceleration pedal position sensor (APS) to detect the pressed amount of an acceleration pedal is turned on.

As turning-on of the APS means accelerating of the vehicle, this situation does not correspond to a shift state before a stop.

If the APS is turned off, i.e., during coasting of the vehicle, when creep torque values before and after creep torque control become equal, in other words, when a creep torque value controlled by creep torque control (an actual creep torque value) becomes equal to a target creep torque value set before execution of a shift, i.e., when an actual creep torque value controlled during a shift becomes equal to a target creep torque value, the vehicle with the DCT does not immediately release creep torque control but releases creep torque control in consideration of the current shift gear position of the DCT.

Further, if the APS is turned off and creep torque values before and after creep torque control are different, in other words, if the actual creep torque value changed by creep torque control differs from the target creep torque value determined before execution of creep torque control, the vehicle with the DCT does not release creep torque control but releases creep torque control when conditions are satisfied in consideration of the current shift gear position, as safety conditions.

First, when a difference between the target creep torque value set before creep torque control and the actual creep torque value changed by creep torque control is a predetermined reference value α or less, it is judged that creep torque values before and after control of creep torque are equal, i.e., that the actual creep torque changed by creep torque control reaches the target creep torque. It serves to consider errors commonly encountered when creep torque is detected.

Here, the actual creep torque means a current creep torque value changed by creep torque control and the target creep torque means a creep torque value desired to be reached through creep torque control at a shift before a stop.

Upon judging that the actual creep torque is equal to the target creep torque, when the current shift gear position of the DCT is the first gear position, creep torque control is released. The reason for this is that, since creep torque control is executed at a shift before a stop, creep torque control is released before a stop and the first gear position is generally a shift gear position just before a stop of a vehicle.

Further, regardless of whether or not the actual creep torque and the target creep torque are equal, i.e., even if the actual creep torque value controlled during a shift is different from the target creep torque value, as safety conditions to prevent generation of impossibility of starting the vehicle when the vehicle is restarted, creep torque control is released when the current shift gear position of the DCT is the parking position (P position) for parking, the reverse position (R position) for reversing, or the neutral position (N position) for releasing connection for power transmission between the DCT and a motor.

Since the creep torque value is fixed at the parking position (P position) and the reverse position (R position), the vehicle does not move even if the brake is turned off and, thus, if creep torque control is not released, impossibility of starting the vehicle may be achieved.

Therethrough, if a driver shifts from the second gear position to the neutral position (N position), the parking position (P position) or the reverse position (R position), releasing creep torque control is not possible. Therefore, generation of impossibility of starting the vehicle may be avoided when the vehicle is restarted.

Further, in a state in which the vehicle does not enter the above shift gear position conditions, i.e., if the current shift gear position of the DCT is the second gear position or the third gear position, creep torque control is released when the current vehicle speed is a set threshold value β or less. By releasing creep torque control when the current vehicle speed is a specific vehicle speed β or less at which it may be judged sudden braking is generated before execution of a shift before a stop, if the current shift gear position is the second gear position or the third gear position, starting delay when the vehicle is stopped through sudden braking and then restarted may be minimized.

The above threshold value β is set to be a vehicle speed value just before a stop or a value close to the stopped state (a vehicle speed value of '0').

As described above, if creep torque control is released before a stop under conditions of the present disclosure, as exemplarily shown in FIG. 2, even when creep torque is controlled to have a negative (−) torque value, a vehicle coasting speed is not excessively lowered and, in the on state of the brake (i.e., during braking in the off state of the APS and the on state of the BPS), creep torque is controlled to have a negative (−) torque value close to 0 at a shift before a stop and, instructions are changed to a positive (+) torque value during shift of the DCT so as to raise motor torque, thereby smoothly executing a shift before a stop.

As is apparent from the above description, in a method for releasing creep torque control of a vehicle before a stop in accordance with the present disclosure, creep torque control executed at shift of a hybrid electric vehicle with a dual clutch transmission (DCT) before a stop may be released under optimum conditions and thus fuel efficiency improves, and braking linearity is greatly improved and suitable to be mass-produced, as compared to a conventional method.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for releasing creep torque control of a vehicle before a stop, comprising:
    when creep torque is controlled for a shift before a stop of the vehicle, releasing creep torque control in consideration of a current shift gear position if an actual creep torque value controlled during a shift becomes equal to a target creep torque value,
    wherein if a difference between the actual creep torque value controlled during a shift and the target creep torque value is a predetermined reference value or less, it is judged that the actual creep torque value and the target creep torque are equal.

2. The method of claim 1, wherein when the current shift gear position is a first gear position, creep torque control is released.

3. The method of claim 1, wherein when the current shift gear position is a parking position, creep torque control is released.

4. The method of claim 1, wherein when the current shift gear position is a parking position, even if there is a difference between the actual creep torque value controlled during a shift and the target creep torque value, creep torque control is released.

5. The method of claim 1, wherein when the current shift gear position is a reverse position, creep torque control is released.

6. The method of claim 1, wherein when the current shift gear position is a reverse position, even if there is a difference between the actual creep torque value controlled during a shift and the target creep torque value, creep torque control is released.

7. The method of claim 1, wherein when the current shift gear position is a neutral position, creep torque control is released.

8. The method of claim 1, wherein when the current shift gear position is a neutral position, even if there is a difference between the actual creep torque value controlled during a shift and the target creep torque value, creep torque control is released.

9. The method of claim 1, wherein when the current shift gear position is a second gear position or a third gear position among a first gear position, the second gear position and the third gear position and a current vehicle speed is a predetermined threshold value or less, creep torque control is released.

10. The method of claim 1 wherein the current shift gear position is a shift gear position of a dual clutch transmission (DCT).

* * * * *